US008468551B2

(12) United States Patent
Baratakke et al.

(10) Patent No.: US 8,468,551 B2
(45) Date of Patent: Jun. 18, 2013

(54) HYPERVISOR-BASED DATA TRANSFER

(75) Inventors: Kavitha Vittal Murthy Baratakke, Round Rock, TX (US); Pramod Achyut Bhandiwad, Bangalore (IN); Nikhil Hegde, Austin, TX (US); Sivakumar Krishnasamy, Bangalore (IN); G Shantala, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 12/827,741

(22) Filed: Jun. 30, 2010

(65) Prior Publication Data

US 2012/0005671 A1 Jan. 5, 2012

(51) Int. Cl.
*G06F 9/455* (2006.01)
*G06F 9/46* (2006.01)
*G06F 3/00* (2006.01)

(52) U.S. Cl.
USPC .............................. 719/324; 718/104; 718/1

(58) Field of Classification Search
None
See application file for complete search history.

(56) References Cited

U.S. PATENT DOCUMENTS

| | | | | |
|---|---|---|---|---|
| 7,480,742 | B2* | 1/2009 | Arndt et al. | 719/324 |
| 7,530,071 | B2* | 5/2009 | Billau et al. | 719/324 |
| 7,577,764 | B2* | 8/2009 | Arndt et al. | 719/324 |
| 2002/0129082 | A1* | 9/2002 | Baskey et al. | 709/102 |
| 2008/0301692 | A1* | 12/2008 | Billau et al. | 718/104 |
| 2009/0037941 | A1* | 2/2009 | Armstrong et al. | 719/328 |
| 2009/0055831 | A1* | 2/2009 | Bauman et al. | 718/104 |
| 2009/0307445 | A1* | 12/2009 | Jacobs et al. | 718/104 |
| 2009/0307690 | A1* | 12/2009 | Logan et al. | 718/1 |
| 2010/0122124 | A1* | 5/2010 | Chen et al. | 718/1 |

OTHER PUBLICATIONS

"I/O for Virtual Machine Monitors Security and Performance Issues", Paul Karger, 2008, pp. 1-8.*
"DB2 Virtualization", IBM Redbooks, 2009, pp. 1-158.*
"Nomad: Migrating OS-bypass Networks in Virtual Machines", Huang, 2007, pp. 1-11.*
IBM Virtual I/O Server, IBM Wikis article, www.ibm.com/developerworks/wikis/display/virtualization/Virtual+IO+Server, May 9, 2008.
IBM System p Virtualization—The most complete virtualization offering for UNIX and Linux, IBM Software Announcement 207-269, www-01.ibm.com/cgi-bin/common/ssi/ssialias?infotype=an&subtype=ca&htmlfid=897/ENUS207-269&appname=usn&language=enus, Nov. 6, 2007.

* cited by examiner

*Primary Examiner* — Tuan Dao
(74) *Attorney, Agent, or Firm* — Anthony V. S. England; Matthew Talpis

(57) ABSTRACT

In a computer system having memory, at least one processor and a physical input-output adapter, the at least one processor generates logical partitions, including local logical partitions and an input-output logical partition. The logical partitions have respective local virtual adapters. The input-output logical partition has a shared virtual adapter configured to communicate with the physical input-output adapter, such that a plurality of the local logical partitions share the physical input-output adapter via the shared virtual adapter. The at least one processor provides communication for ones of the local virtual adapters of the local logical partitions directly with the physical input-output adapter by a hypervisor.

15 Claims, 5 Drawing Sheets

HYPERVISOR-BASED DATA TRANSFER

TECHNICAL FIELD

The present invention relates generally to an improved data processing system and to an improved method and computer program product for processing data. Still more particularly, the present invention relates to a method, apparatus, and computer program product for data transfer facilitated by a hypervisor in a computer system.

DESCRIPTION OF RELATED ART

A virtual I/O server provides input/output processing for client logical partitions in a computer system and has shared Ethernet adapters to provide common access interfaces to respective physical Ethernet adapters by bridging packets to and from more than one client logical partition to a single physical Ethernet adapter. The shared Ethernet adapter functions are a major processing power consumer. Therefore, a need exists to improve data transfers in this context.

SUMMARY OF THE INVENTION

The present invention provides a method, apparatus, and computer program product for data transfer facilitated by a hypervisor in a computer system.

In one form of the invention a computer system includes a physical input-output adapter and at least one processor and memory. The memory has instructions for execution by the at least one processor. The system is configured with the instructions and the at least one processor to generate logical partitions, including local logical partitions and an input-output logical partition.

The instruction execution by the at least one processor provides the local logical partitions with respective local virtual adapters. The instruction execution further provides a shared virtual adapter for the input-output logical partition, in which the shared virtual adapter is configured to communicate with the physical input-output adapter. The local logical partitions share the physical input-output adapter via the shared virtual adapter. The system is configured to selectively provide communication for ones of the local virtual adapters of the local logical partitions directly with the physical input-output adapter by a hypervisor.

In another aspect, the system includes a data structure for the physical input-output adapter, and the communicating for ones of the local virtual adapters of the local logical partitions directly with the physical input-output adapter by a hypervisor includes the hypervisor accessing the data structure.

In another aspect, the communicating for ones of the local virtual adapters of the local logical partitions directly with the physical input-output adapter includes communication with a driver of the physical input-output adapter.

In another aspect, the hypervisor is configured to initiate remote memory data access operations for the providing of communication directly with a driver for the physical input-output adapter.

In another aspect, the remote memory data access operations transfer data from memory allocated to ones of the local virtual adapters of the local logical partitions directly to memory allocated to the driver without transferring data to memory allocated to the shared adapter.

In another aspect, the remote memory data access operations transfer data from memory allocated to ones of the local virtual adapters of the local logical partitions directly to memory allocated to the driver without transferring data to memory for a local virtual adapter of the input-output logical partition.

In another aspect, the data structure for the physical input-output adapters includes, for each one of the physical input-output adapters, a media access control address and one or more identifiers indicating one or more virtual local area networks with which each one of the physical input-output adapter is associated. Methods and computer program products providing aspects of the above-summarized features are also described and claimed herein.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
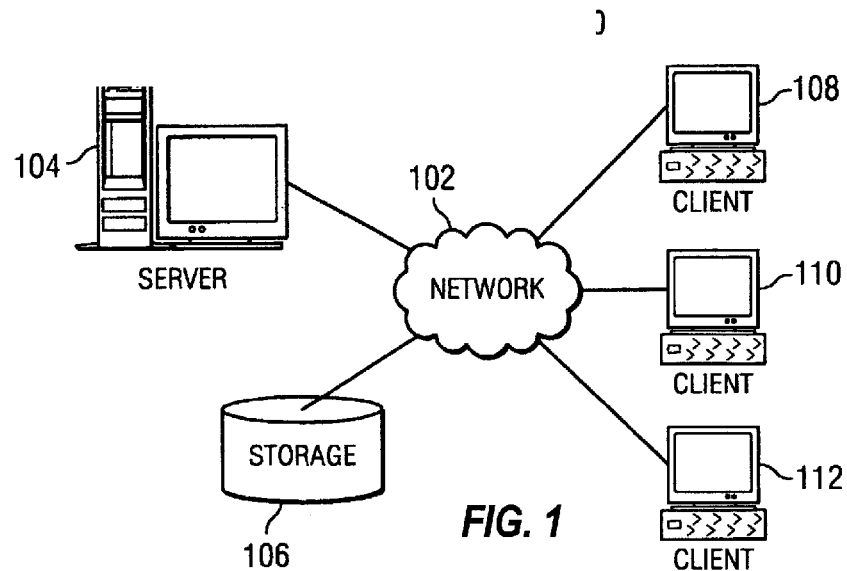
FIG. 1 depicts a pictorial representation of a network of data processing systems in which the present invention may be implemented.

With reference now to the Figures, FIG. 1 depicts a pictorial representation of a network of data processing systems (also referred to as "computer systems") in which the present invention may be implemented. Network data processing system 100 is a network of computer systems in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, one of the computer systems, server 104, is connected to network 102 along with storage unit 106. In addition, other computer systems, clients 108, 110, and 112, are depicted and are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/ Internet Protocol (TCP/IP) suite of protocols to communicate with one another.

At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
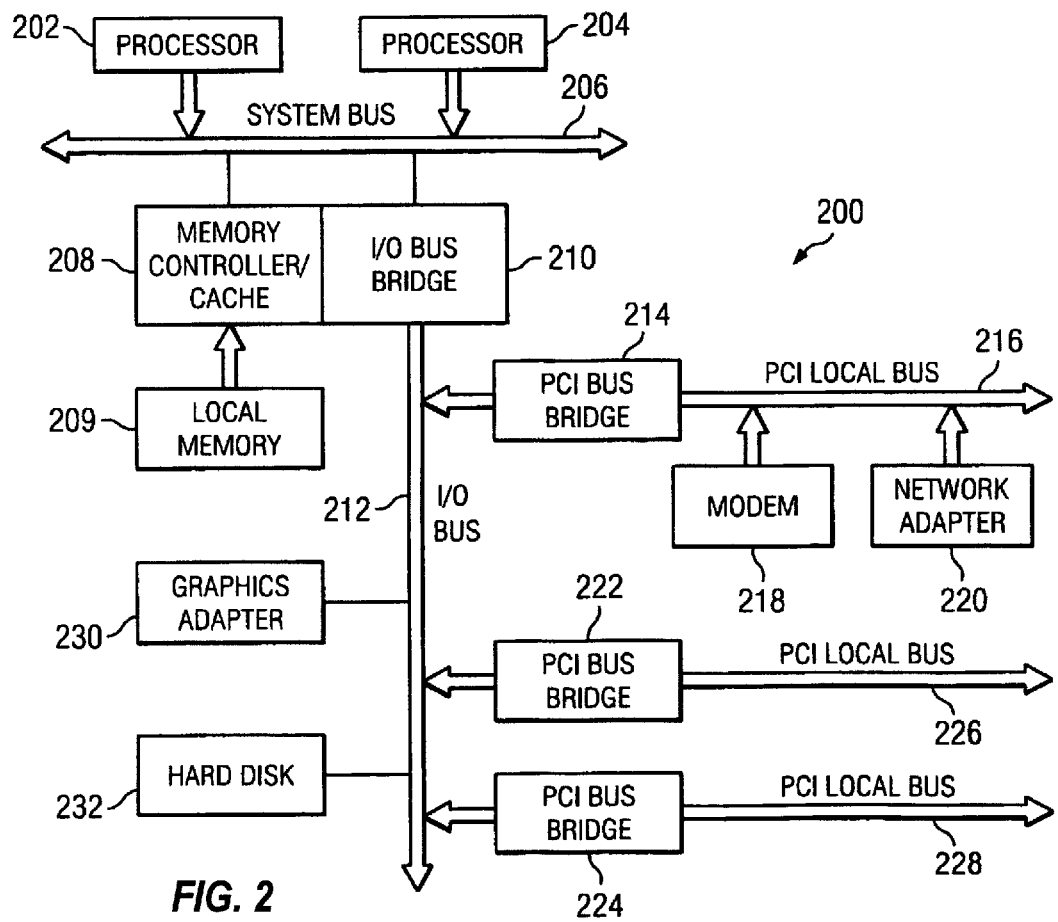
FIG. 2 is a block diagram of a data processing system that may be implemented as a server in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of microprocessors 202 and 204 connected to system bus 206. Alternatively, a single microprocessor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-server p series system, a product of International Business Machines Corporation in Armonk, N.Y., running the Advanced Interactive Executive (AIX) operating system or LINUX operating system. (AIX is a trademark of the International Business Machines Corporation.)

Figure 3:
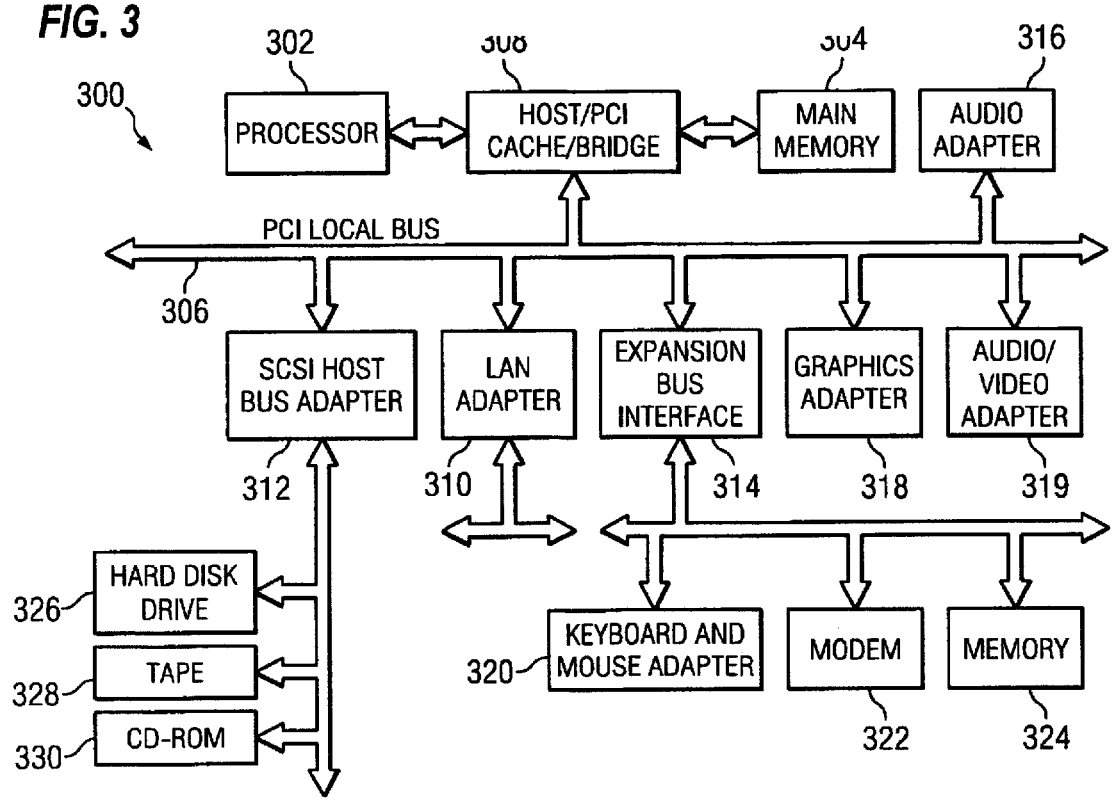
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Microprocessor 302 and main memory 304 are connected to PCI local bus 306 through PCI Bridge 308. PCI Bridge 308 also may include an integrated memory controller and cache memory for microprocessor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on microprocessor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by microprocessor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. In addition, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
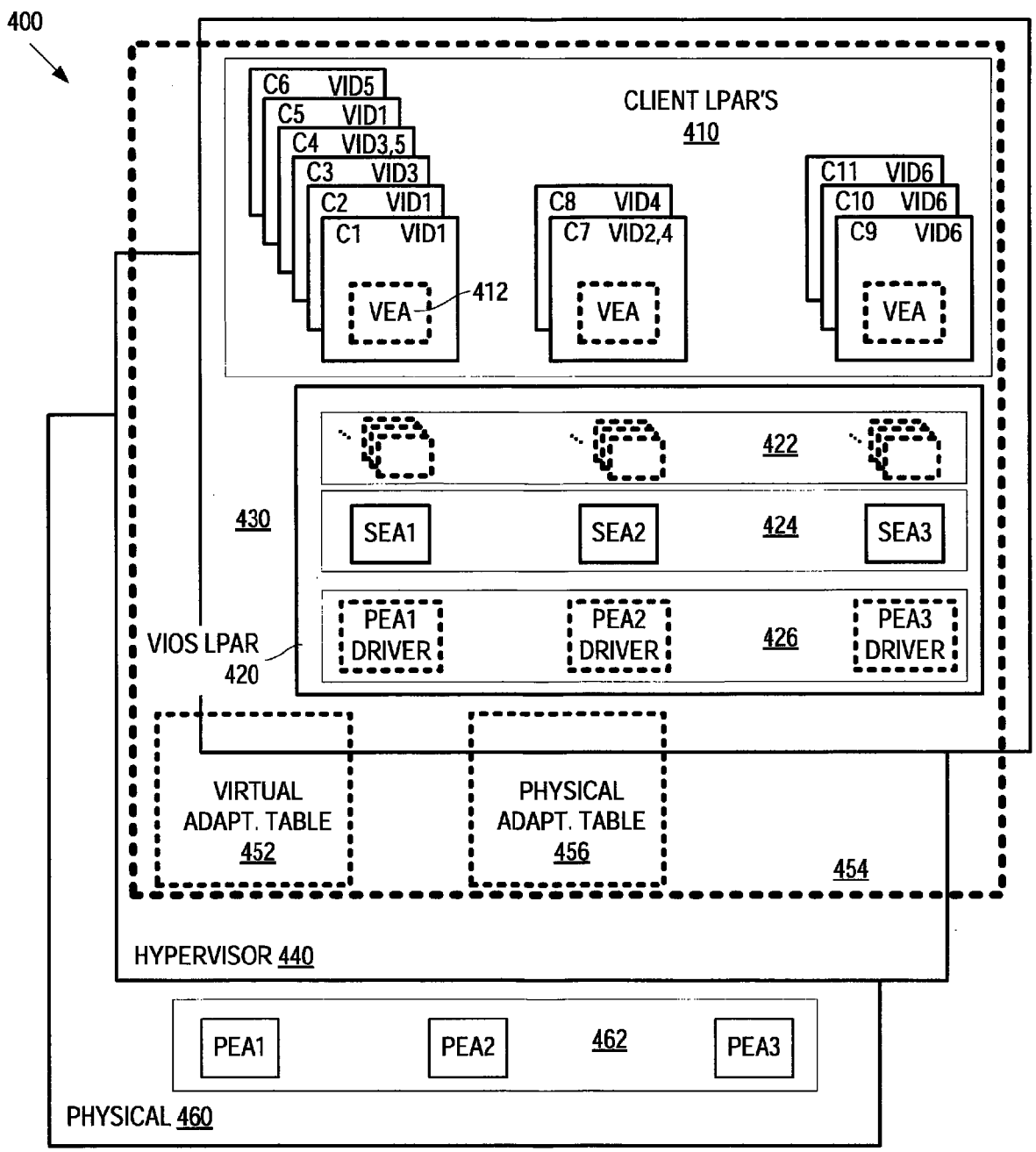
FIG. 4 is a block diagram of aspects of a computer system, in accordance with one or more embodiments of the present invention.

FIG. 4 is a block diagram of certain aspects of a computer system 400, which may preferably be a server, such as described herein above and illustrated in FIGS. 1 and 2. Data to and from computer system 400 may be transmitted by any suitable means over any suitable medium, including network 102 in FIG. 1 or the Internet.

Microprocessors, memory, and other hardware resources of computer system 400 may be apportioned into client logical partitions (LPAR's) 410 that may operate independently, each LPAR 410 running its own operating system and applications. In the example illustrated, client LPAR's 410 include client LPAR's labeled C1, C2, C3, etc., through C11. Each LPAR 410 may also communicate with the other LPAR's 410, as if each one is a separate machine. Typically, respective LPAR's 410 are used for respective purposes, such as database operations, client/server operations, Web server operations, test environments, and production environments. The AIX operating system supports such logical partitioning. In some systems, logical partitioning may be dynamic, wherein the system's resources may be logically attached and detached from a logical partition's operating system without rebooting.

A user of computer system 400 may assign respective physical input/output (I/O) adapters 462 in a physical layer 460 to respective LPAR's for communication to and from the LPAR's. Alternatively, the user may assign a physical I/O adapter to be shared by more than one LPAR via an LPAR 420 that is dedicated to implementing I/O functionality by executing virtual I/O server (VIOS) software. The VIOS is also capable of enabling the assignment of respective physical I/O adapters exclusively to respective LPAR's. The LPAR 420 running VIOS software may be referred to herein as a VIOS. Likewise, the executing VIOS software, which provides VIOS functionality, may be referred to herein as a VIOS.

Logical partitioning is facilitated by software 440 (a "hypervisor") that controls the computer system's hardware and monitors the operating systems of the LPAR's. That is, hypervisor 440 operates at a level between the logical partition operating systems, which are illustrated at a level 430, and computer system 400 hardware at a physical layer 460. The operating systems that run at layer 430 above hypervisor 440 may be referred to as "guest" operating systems. Hypervisor 440 may run directly on the computer system's hardware 460 or within a conventional operating system environment, depending upon the implementation. Memory may be address-controlled by the hypervisor. For real-mode addressing by operating systems, the hypervisor may evaluate a hardware address-offset with an operating system address-offset in order to determine a physical memory address.

One way of enabling Internet protocol-based communication among LPAR's within the same computer system is by software-based, virtual Ethernet adapters, which hypervisor 440 may provide. Virtual Ethernet adapters (which may be referred to herein as "VEA's") are, accordingly, provided for client LPAR's 410 and VIOS LPAR 420. LPAR's 410 may be serviced by VIOS LPAR 420. For at least this reason LPAR's 410 may be referred to as "client" LPAR's. They may also be referred to herein more generally as "local" LPAR's or "local" logical partitions, particularly since the teachings herein provide for LPAR's 410 to also communicate more directly with physical input-output adapters. In the illustrated example shown, client LPAR's 410 have access to VEA's 412 and VIOS LPAR 420 have access to VEA's 422. VEA's 412 and 422 allow communication among logical partitions within the same computer system 400 without using physical Ethernet adapters. Accordingly, they may be referred to herein as "local" virtual adapters. They are particularly useful when an Ethernet connection is needed and the computer system has no slot available for a dedicated, physical Ethernet adapter. Note that in one or more embodiments of the present invention, VIOS LPAR 420 may omit VEA's 422 due to the capability for RDMA transfers described herein.

Virtual Ethernet adapters may be connected to a virtual Ethernet switch (not explicitly shown), which may be implemented by hypervisor 440 (that is, as part of the hypervisor). Using this switch function, logical partitions 410 and 420 can communicate with each other by using virtual Ethernet adapters 412 and 422. Computer system 400 transmits packets by copying the packets directly from the memory of one of the sender logical partitions 410 or 420 to the receive buffers of one of the receiver logical partitions 410 or 420 via the virtual Ethernet adapters 412 or 422 and the Ethernet switch without any intermediate buffering of the packets.

As previously stated, Internet protocol-based communication among LPAR's within a computer system (that is, locally) may be enabled using software-based, virtual Ethernet adapters provided by hypervisor 440. The VIOS enables logical partitions to also communicate with external (that is, remote) computer systems via virtual Ethernet adapters 412 for client LPAR's 410 using shared Ethernet adapters (SEAs) 424, functionality for which is provided by the operating system of VIOS 420. An SEA 424 may be software that runs on VIOS 420 and that bridges i) a real, i.e., physical Ethernet adapter 462, which is coupled to an external network of computer system 400 and ii) one or more virtual Ethernet adapters 412 for client LPAR's 410. That is, using a SEA 424 in the VIOS 420, client LPAR's 410 share access to the physical network and communicate with external computer systems and logical partitions on those computer systems.

SEA's eliminate the need for each client logical partition to have a dedicated physical Ethernet adapter in order to connect to the external network. An SEA running in the VIOS forwards outbound packets received from a virtual Ethernet adapter of a client LPAR to the external network. Likewise, the SEA forwards inbound packets to the virtual Ethernet adapter of the client LPAR. The SEA of the VIOS and the virtual Ethernet adapter for the client LPAR provide a virtual Ethernet link. The SEA processes packets at ISO layer 2, so the original media access control (MAC) address and VLAN tags of the packet are visible to other systems on the physical network.

Ethernet adapters may be assigned membership in a virtual local area network (VLAN) by assigning them an identifier (VID) for the VLAN. For example, C1 client LPAR 410 in FIG. 4 has a VEA 412 assigned membership in the VLAN identified by VID 1, C2 client LPAR 410 has a VEA 412 also assigned membership in the VLAN identified by VID 1, C3 client LPAR 410 has a VEA 412 assigned membership in the VLAN identified by VID 3, C4 client LPAR 410 has a VEA 412 assigned membership in the VLAN identified by VID's 3 and 5, etc. Whether they are virtual or physical, shared or not shared, Ethernet adapters may connect to a physical or virtual Ethernet switch. (A virtual switch may be a virtual local area network (VLAN) switch. The ports of a VLAN switch may include virtual Ethernet adapters.) By tagging Ethernet packets with the VID, delivery may be restricted to Ethernet adapters in the designated VLAN by a port passing only packets that are untagged or else tagged as one of the VLANs to which the port belongs. That is, the port may exclude packets that are tagged as one of the VLANs to which the port does not belong.

The default VID for a port is referred to as the Port VID (PVID). A node (for example, a computer system or an LPAR) may be VLAN-aware or VLAN-unaware. The VID can be added to an Ethernet packet either by a VLAN-aware node, or by the switch in the case of VLAN-unaware nodes. Ports on an Ethernet switch are, therefore, also configured with information indicating whether the connected node is VLAN-aware.

For a VLAN-unaware node, a port is set up as untagged and for all packets sent by the node through the port, the switch tags the packets with the PVID. It will also untag all packets received by the port for the VLAN unaware node before delivery to the node. A port used to connect VLAN-unaware nodes is called an untagged port, and it can be a member of only a single VLAN identified by its PVID. Nodes that are VLAN-aware can insert and remove their own tags and can be members of more than one VLAN. These nodes are typically attached to ports that do not remove the tags before delivering the packets to the node, but will insert the PVID tag when an untagged packet enters the port.

The following MAC/VID virtual adapter table (VAT) corresponds to VAT 452 in FIG. 4 and defines relationships are among virtual local area networks and virtual Ethernet adapters. If C1 LPAR 410 has a VEA 412 with MAC address aa:aa:aa:aa:aa:aa assigned to a VLAN identified by VID 1, C2 LPAR 410 has a VEA 412 with MAC address bb:bb:bb:bb:bb:bb assigned to a VLAN identified by VID 1, and C3 LPAR 410 has a VEA 412 with MAC address cc:cc:cc:cc:cc:cc assigned to a VLAN identified by VID 3, etc., the VAT has entries as shown, wherein each line is for a VEA.

TABLE 1

Virtual Adapter Table (VAT)

| MAC address | VID info |
| --- | --- |
| aa:aa:aa:aa:aa:aa | 1 |
| bb:bb:bb:bb:bb:bb | 1 |
| cc:cc:cc:cc:cc:cc | 3 |
| etc. | |

Since all network traffic to client partitions may go through SEAs, the SEA function of the VIO Server is a major processing resource consumer. As such, reduction in SEA processing can lead to significant reduction in overall processing resource consumption, which can free up processing resources for client LPAR's.

Typically, for a logical client partition to communicate data to an external computer system, it requests transfer of the data from its local memory to the memory space of its assigned virtual adapter, i.e., a SEA of the VIOS. This request is done by a remote direct memory access (RDMA), call to the hypervisor. In this context, RDMA refers to a transport capability that allows processes running on one node connected to a network adapter to directly access (read or write against) the memory of processes running on a different node connected to the same network without any protocol processing on the target end point of the transport operation.

Responsive to the RDMA call, the hypervisor copies data from the memory allocated for the client LPAR to first memory allocated to the VIOS LPAR for the SEA. The SEA has only one physical interface, which may be a physical adapter by itself or an aggregation of physical adapters. If the physical interface is a single physical adapter, the SEA transfers the data to second memory allocated to the VIOS for the driver of the physical adapter using the VIOS operating system. If the physical interface is an aggregation of physical adapters, an aggregation protocol identifies the physical adapter to be used for sending out the data, and the SEA transfers the data to the second memory allocated to the VIOS for the driver of the physical adapter selected by the aggregation protocol. Upon receiving the data, the physical adapter transfers the data to the remote computer system.

Instead of the preceding, however, according to one or more embodiments of the present invention, hypervisor 440 directly copies network traffic data from the memory allocated for a client (i.e., local) LPAR VEA 412 to a driver 426 for a physical network interface card, thereby reducing memory transactions and also improving network traffic performance. To do this, a firmware (or firmware and hardware) layer 454 is added between VIOS 420 and hypervisor 440 to provide SEA 424 bridging functionality, i.e., to transfer packets directly between local virtual Ethernet adapters 412 for client (i.e., local) LPAR's 410 and drivers 426 for physical Ethernet adapters 462, rather than indirectly via SEA's 424.

In one or more embodiments of the invention, one or more physical Ethernet adapter drivers 426 are provided in layer 454. Layer 454 provides direct paths that bridge network packets directly from drivers 426 and their physical Ethernet adapters 462 to virtual Ethernet adapters 412 in client LPAR's 410, and vice-versa. The direct paths provide improved information to hypervisor 440 that the computer system 400 uses more efficiently in lieu of SEA 424 processing. This improved information may be provided, at least in part, by mapping information indicating VID's that are assigned to physical adapter MAC addresses, which is provided by a MAC/VID table or other data structure, or by additions to an existing table or other data structure.

Layer 454 may also provide a user interface, which may be a command line interface (CLI), configured to receive user commands and responsively create and configure adapters and mapping (e.g., MAC/VID table).

The following MAC/VID physical adapter table (PAT) 456 is included in layer 454 and provides an example in which relationships are defined among virtual local area networks and physical Ethernet adapters 462 and their drivers 426.

TABLE 2

Physical Adapter Table (PAT)

| MAC address | VID info |
| --- | --- |
| xx:xx:xx:xx:xx:xx | 1, 3, 5 |
| YY:YY:YY:YY:YY:YY | 2, 4 |
| zz:zz:zz:zz:zz:zz | 6 |

In this example, each line in the table corresponds to a physical Ethernet adapter and its assigned VLAN's and defines MAC addresses for each physical Ethernet adapter. The table shown in the example has three MAC addresses corresponding to three physical Ethernet adapters. The table assigns the physical adapter having MAC address xx:xx:xx:xx:xx:xx to three VLAN's having VID's 1,3,5, for example.

The new table in layer 454 exposes the physical Ethernet adapter and VID assignments to the hypervisor. So, for example, whenever the hypervisor has network traffic data from a client LPAR, where the data is tagged with a VID of 1,3 or 5, the new layer provides a map for the hypervisor that allows the hypervisor to transfer the data from the memory allocated to the virtual Ethernet adapter of the client LPAR directly to the memory allocated to the driver of the physical NIC at MAC address xx:xx:xx:xx:xx:xx for the indicated VID.

Further, to improve network availability two VIOS's are sometimes provided in a single computer system. According to embodiments of the present invention, improved network availability can alternatively be achieved by providing two or more of layer 454 in a redundant configuration, instead of two VIOS's. In addition to redundancy at layer 454, multiple NICs are used in a redundant fashion, as well, in embodiments of the present invention.

In another aspect, according to embodiments of the present invention, the MAC/VID table, or at least frequently accessed entries thereof, may be provided in a hardware structure that further increases the speed of determining the path for data transfers between client LPAR's and physical adapters, such as a high speed cache.

An embodiment of the present invention, new information 456 is provided as part of an existing data structure, such as part of a virtual adapter table 452, which may be in hypervisor 440, or at least may be accessible to hypervisor 440 in an adjacent layer. For this embodiment, table 452 is provided with an additional attribute for each entry indicating if the entry is for a physical or virtual adapter and thereby becomes a virtual and physical adapter table. Alternatively, new information 456 may be provided as a separate data structure, such as a table, which may be referred to as a physical adapter table, which likewise may be in hypervisor, or at least may be accessible to hypervisor 440 in an adjacent layer. The following illustrative description assumes a separate table.

According to an embodiment of the present invention, PAT 456 is provided and has an entry for each shared Ethernet adapter's respective physical Ethernet adapter 462 (or respective group of physical Ethernet adapters). PAT 456 may be maintained by hypervisor 440 and includes an MAC address and one or more VID's for each PEA 462.

Figure 5A:
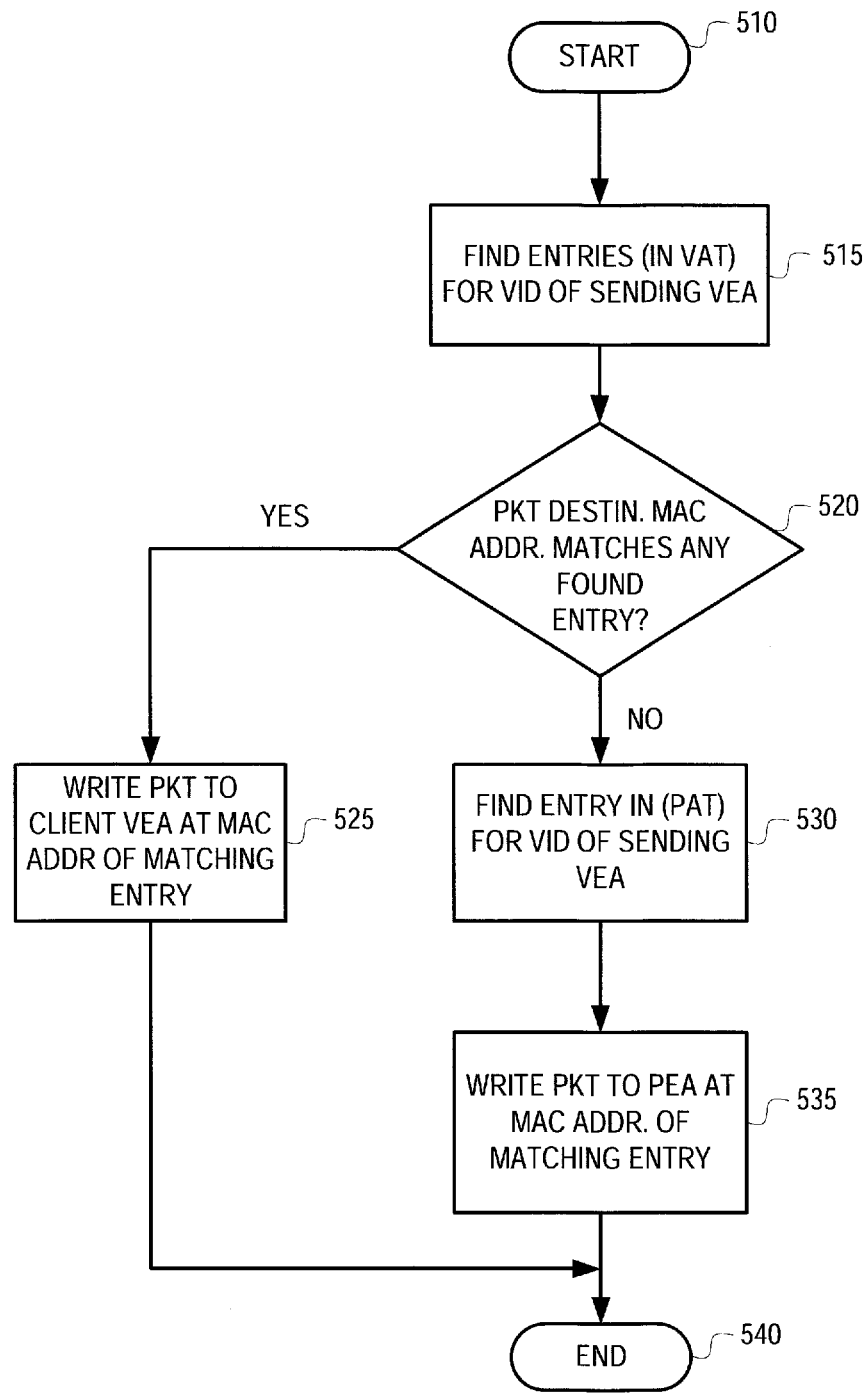
FIG. 5A is a flow chart illustrating processes for transmitting data, in accordance with one or more embodiments of the present invention.

Referring now to FIG. 5A, processes performed by the hypervisor for packet flow from a client LPAR are illustrated, according to one or more embodiments of the present invention. At 515, the hypervisor finds entries in the VAT that have the same VID as the sending client's VEA. Looking within the set of these entries, at 520, the hypervisor determines if there is one having a MAC address that matches the destination MAC address of the packet. If yes, the hypervisor proceeds to a process at 525. If no, the hypervisor proceeds to a process at 530.

At 525, the hypervisor writes the data directly to the destination client's VEA (in the local computer system), which is identified by a destination MAC address in the data packet and then, at 540, proceeds to end the hypervisor's involvement in at least this aspect of the transaction. Alternatively, at 530, the hypervisor finds the entry in the PAT that has the same VID as the sending client's VEA. Then, the hypervisor writes the data directly to the physical adapter's memory, so the adapter can send it out to the external network, whereupon the packet may be transmitted to a remote computer system or may be returned to the sending computer system. Then, at 540, the hypervisor proceeds to end the hypervisor's involvement in at least this aspect of the transaction.

Figure 5B:
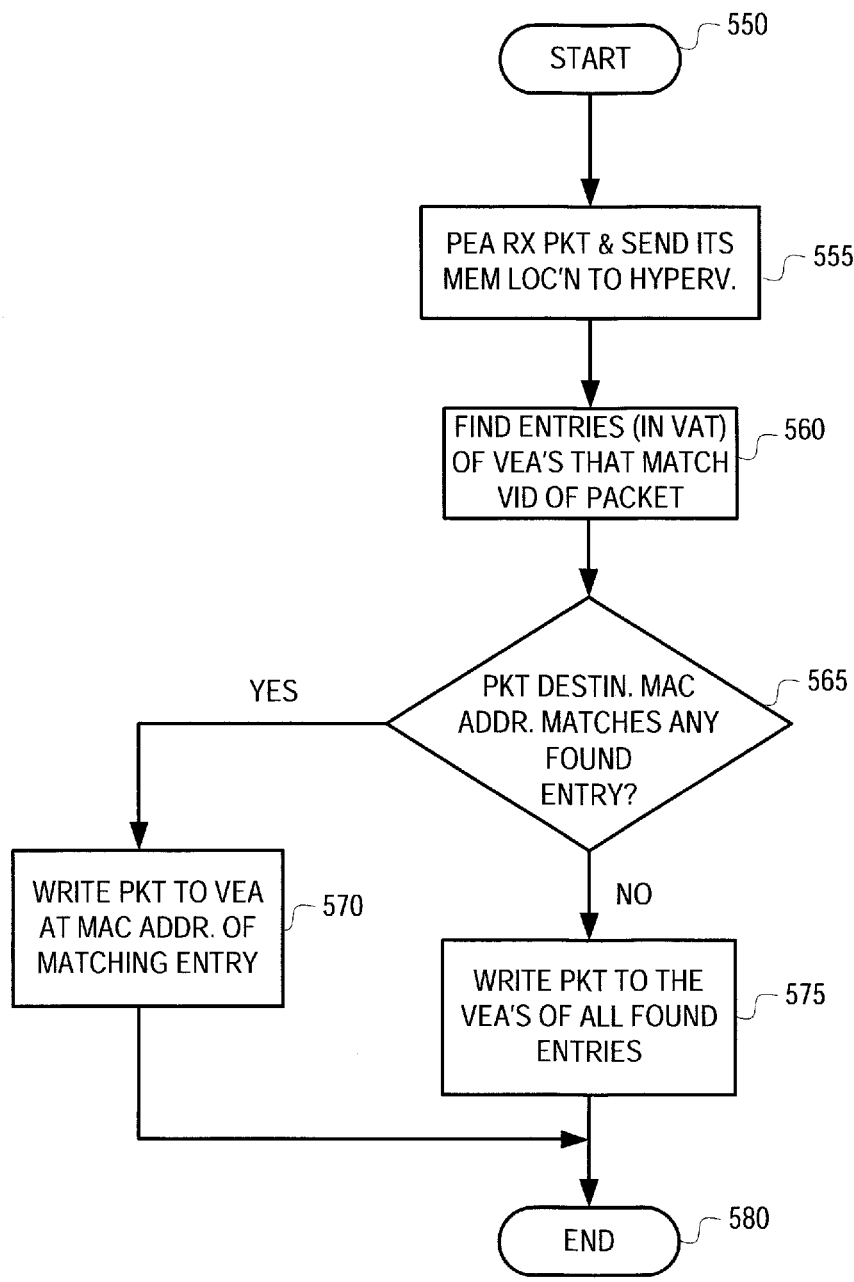
FIG. 5B is a flow chart illustrating processes for receiving data, in accordance with one or more embodiments of the present invention.

Referring now to FIG. 5B, a process performed by the hypervisor for packet flow to a client LPAR from an external network is illustrated, according to one or more embodiments of the present invention. The packet may originate from a remote computer system or from the local computer system. At 555, a packet is received by a PEA and the PEA's device driver sends to the hypervisor the location of the packet in the PEA's device driver memory. Responsive to receiving the communication from the PEA device driver, at 560 the hypervisor finds entries in the VAT of VEA's having the same VID as the received packet. Then, at 565, looking in the VAT within the set of these VEA entries, the hypervisor determines if there is a VEA having a MAC address that matches the destination MAC address of the packet. If yes, the hypervisor proceeds to a process at 570. If no, the hypervisor proceeds to a process at 575.

At 570, the hypervisor writes the data directly from the PEA's memory to the destination client's VEA (in the local computer system) that the hypervisor found at 570, and then, at 580, proceeds to end the hypervisor's involvement in at least this aspect of the transaction. Alternatively, at 575, the hypervisor makes as many copies of the packet as the number of VEAs found in 565 and sends each of them a copy. Then, at 580, the hypervisor proceeds to end the hypervisor's involvement in at least this aspect of the transaction.

The following tables provide pseudo code for implementing the processes described herein above, according to one or more embodiments of the invention.

TABLE 3

Packet flow from client VEA

NAME: VEAPacketTransmit
INPUT: Ethernet packet
OUTPUT: Packet transmission to next hop towards destination
CONSTANTS: Virtual Adapter Table (VAT), Physical Adapter Table (PAT)
START: VEAPacketTransmit
/* Check if destination is another CLIENT VEA in the same system */
for each entry in VAT
for each VID in VAT entry
if (VID in VAT entry == VID of VEA) OR (VID in VAT entry == VID in packet)
if MAC in VAT entry == destination MAC in packet
copy packet to memory region of destination VEA
notify destination VEA of arrival of packet
notify source VEA of successful transmission
END
/* Destination is not in same system */
for each entry in PAT
for each VID in PAT entry
if (VID in PAT entry == VID of VEA) OR (VID in PAT entry == VID in packet)
Initiate RDMA transfer of packet from VEA memory to physical adapter memory
Wait for RDMA transfer complete notification
notify source VEA of successful transmission
END

TABLE 4

Packet flow from external network to client VEA

NAME: PEAPackeReceive
INPUT: Ethernet packet
OUTPUT: Packet transmission from PEA to destination VEA
CONSTANTS: Virtual Adapter Table (VAT), Physical Adapter Table (PAT)
INIT: Packet is received in the PEA
PEA device driver sends the location of the packet in PEA memory to the Hypervisor
START: PEAPacketReceive
for each entry in VAT
for each VID in VAT entry
if (VID in VAT entry == VID of VEA) OR (VID in VAT entry == VID in packet)
if MAC in VAT entry == destination MAC in packet
initiate an RDMA transfer of packet from PEA memory to memory region of destination VEA
notify destination VEA of arrival of packet
END
/* Destination is not in same system */
find total number of VEAs listed in VAT
for each VEA in VAT
initiate RDMA transfer of packet from PEA memory to memory region of VEA
notify destination VEA of arrival of packet
END
(Source client VEA to destination client VEA is covered in Table 1)

The teachings herein provide an improvement in performance and throughput. In one aspect, the teachings concern changes regarding client and VIOS logical partitions and a hypervisor. The hypervisor goes through a process of finding a VEA that matches the destination MAC address and VID of a data packet in order to determine whether the packet is destined for one of the other client LPAR's in the same system. However, if the hypervisor does not find a match, indicating that the packet is not destined for one of the other client LPAR's in the same system, then, instead of simply sending the packet to a trunk adapter (i.e., a virtual Ethernet adapter not assigned to a VLAN), the hypervisor looks at a new data structure 456 to select a PEA. That is, the hypervisor finds a PEA that matches the VID of the packet) and initiates an RDMA transfer to memory for the selected PEA from system memory of the client's VEA. The transfer is responsively performed by hardware and the hypervisor is notified asynchronously when the transfer is completed.

With the changes described in the teachings herein, which may include changing the hypervisor and adding or changing one or more data structures, an instance of the VIOS logical partition making a copy of a packet is avoided in transmitting the packet. This substantially reduces the number of instructions executed in transmitting a packet, providing higher throughput for the system as a whole.

Absent the present teachings, the hypervisor does not differentiate, in certain respects, among the LPAR's. Also, the VIOS partition is more involved in handling communication between the client LPAR's on the local system (i.e., the physical system in which the LPAR's reside) and the PEA's, which are coupled to the outside world (i.e., outside the physical computer system in which the LPAR's reside). The VIOS determines which PEA to use using its own operating system.

A traditional way to improve system network performance is to improve efficiency of the VIOS to make it less of a bottleneck. By contrast, in one or more embodiments of the present invention a Hypervisor uses RDMA to talk directly to PEAs. This supplants a traditional mechanism by which the VIOS determines which PEA to use.

The illustrative processes may be implemented using any suitable software, such as a script, set of instructions, or computer readable program code, or hardware technique such as application integrated circuitry, programmable array, microprocessor; or a combination thereof. Software resides in the memory of a data processing system and a processor implements the software. The software may be installed on computer system 400, or may be installed on a separate computer system operably connected to computer system 400. Likewise, hardware may be a part of computer system 400 or may be separate hardware operably connected thereto.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer system comprising:
   a physical input-output adapter; and
   at least one processor and memory, the memory having instructions for execution by the at least one processor, wherein the system is configured with the instructions and the at least one processor to:
      generate logical partitions, including local logical partitions and an input-output logical partition;
      provide the local logical partitions with respective local virtual adapters; and
      provide a shared virtual adapter for the input-output logical partition, the shared virtual adapter being configured to communicate with the physical input-output adapter, such that a plurality of the local logical partitions share the physical input-output adapter via the shared virtual adapter; and
      communicate for ones of the local virtual adapters of the local logical partitions directly with the physical input-output adapter by a hypervisor;
   wherein the system includes a layer comprising:
      virtual adapters for the local logical partitions, wherein the local logical partition virtual adapters and the physical input-output adapter have respective media access control addresses; and
      a data structure providing associations of the media access control addresses to virtual local area network identifiers of the respective virtual and physical adapters for exposing the associations directly to the hypervisor;
   wherein the communicating for the ones of the local virtual adapters of the local logical partitions directly with the physical input-output adapter by the hypervisor comprises:
      the hypervisor accessing the data structure.

2. The system of claim 1, wherein the communicating for ones of the local virtual adapters of the local logical partitions directly with the physical input-output adapter includes communication with a driver of the physical input-output adapter.

3. The system of claim 2, wherein the system being configured with the instructions and the at least one processor to communicate directly with the driver for the physical input-output adapter includes the hypervisor being configured to initiate remote memory data access operations.

4. The system of claim 3, wherein the remote memory data access operations transfer data from memory allocated to ones of the local virtual adapters of the local logical partitions directly to memory allocated to the driver without transferring data to memory allocated to the shared virtual adapter.

5. The system of claim 3, wherein the remote memory data access operations transfer data from memory allocated to ones of the local virtual adapters of the local logical partitions directly to memory allocated to the driver without transferring data to memory for a local virtual adapter of the input-output logical partition.

6. A non-transitory computer readable storage medium having an executable program stored thereon, wherein the program instructs at least one processor to transfer data by:
   generating logical partitions, including local logical partitions and an input-output logical partition;
   providing the local logical partitions with respective local virtual adapters; and
   providing a shared virtual adapter for the input-output logical partition, the shared virtual adapter being configured to communicate with the physical input-output adapter, such that a plurality of the local logical partitions share the physical input-output adapter via the shared virtual adapter; and
   communicating for ones of the local virtual adapters of the local logical partitions directly with the physical input-output adapter by a hypervisor;
   providing a layer comprising:
   virtual adapters for the local logical partitions, wherein the local logical partition virtual adapters and the physical input-output adapter have respective media access control addresses; and
   a data structure providing associations of the media access control addresses to virtual local area network identifiers of the respective virtual and physical adapters for exposing the associations directly to the hypervisor;
   wherein the communicating for the ones of the local virtual adapters of the local logical partitions directly with the physical input-output adapter by the hypervisor comprises:
      the hypervisor accessing the data structure.

7. The computer readable storage medium of claim 6, wherein the communication for ones of the local virtual adapters of the local logical partitions directly with the physical input-output adapter includes communication with—a driver of the physical input-output adapter.

8. The computer readable storage medium of claim 7, wherein the system communicating directly with the driver for the physical input-output adapters includes the hypervisor initiating a remote memory data access operation.

9. The computer readable storage medium of claim 8, wherein the remote memory data access operation transfers data from memory allocated to ones of the local virtual adapters of the local logical partitions directly to memory allocated to the driver without transferring data to memory allocated to the shared virtual adapter.

10. The computer readable storage medium of claim 8, wherein the remote memory data access operations transfer data from memory allocated to ones of the local virtual adapters of the local logical partitions directly to memory allocated to the driver without transferring data to memory for a local virtual adapter of the input-output logical partition.

11. A method in a computer system, the computer system having memory, at least one processor and a physical input-output adapter, the method comprising:
   generating logical partitions by the at least one processor, including local logical partitions and an input-output logical partition;
   providing the logical partitions with respective local virtual adapters; and
   providing a shared virtual adapter for the input-output logical partition, the shared virtual adapter being configured to communicate with the physical input-output adapter, such that a plurality of the local logical partitions share the physical input-output adapter via the shared virtual adapter; and communicating for ones of the local virtual adapters of the local logical partitions directly with the physical input-output adapter by a hypervisor providing a layer comprising:
- virtual adapters for the local logical partitions, wherein the local logical partition virtual adapters and the physical input-output adapter have respective media access control addresses; and
- a data structure providing associations of the media access control addresses to virtual local area network identifiers of the respective virtual and physical adapters for exposing the associations directly to the hypervisor;

wherein the communicating for the ones of the local virtual adapters of the local logical partitions directly with the physical input-output adapter by the hypervisor comprises:
- the hypervisor accessing the data structure.

12. The method of claim 11, wherein the communication for ones of the local virtual adapters of the local logical partitions directly with the physical input-output adapter includes communication with a driver of the physical input-output adapter.

13. The method of claim 12, wherein the system communicating directly with the driver for the physical input-output adapters includes the hypervisor initiating a remote memory data access operation.

14. The method of claim 13, wherein the remote memory data access operation transfers data from memory allocated to ones of the local virtual adapters of the local logical partitions directly to memory allocated to the driver without transferring data to memory allocated to the shared virtual adapter.

15. The method of claim 13, wherein the remote memory data access operations transfer data from memory allocated to ones of the local virtual adapters of the local logical partitions directly to memory allocated to the driver without transferring data to memory for a local virtual adapter of the input-output logical partition.

* * * * *